(12) United States Patent
Eickemeyer et al.

(10) Patent No.: US 7,797,521 B2
(45) Date of Patent: Sep. 14, 2010

(54) METHOD, SYSTEM, AND COMPUTER PROGRAM PRODUCT FOR PATH-CORRELATED INDIRECT ADDRESS PREDICTIONS

(75) Inventors: Richard J. Eickemeyer, Rochester, MN (US); Michael K. Gschwind, Chappaqua, NY (US); Ravi Nair, Briarcliff Manor, NY (US); Robert A. Philhower, Valley Cottage, NY (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 11/734,519

(22) Filed: Apr. 12, 2007

(65) Prior Publication Data

US 2008/0256347 A1 Oct. 16, 2008

(51) Int. Cl.
*G06F 7/38* (2006.01)
*G06F 9/00* (2006.01)
*G06F 9/44* (2006.01)

(52) U.S. Cl. .................. 712/240; 712/239; 712/238
(58) Field of Classification Search ................. 712/238, 712/240
See application file for complete search history.

(56) References Cited

U.S. PATENT DOCUMENTS

| | | | |
|---|---|---|---|
| 5,577,217 A | 11/1996 | Hoyt et al. | |
| 6,148,396 A | 11/2000 | Chrysos et al. | |
| 6,601,161 B2 | 7/2003 | Rappoport et al. | |
| 2003/0041230 A1 | 2/2003 | Rappoport et al. | |
| 2004/0255104 A1 * | 12/2004 | Akkary et al. | 712/239 |
| 2006/0242393 A1 | 10/2006 | Park et al. | |

OTHER PUBLICATIONS

Chang et al., Target Prediction for Indirect Jumps, 1997.*
Gabriel H. Loh, Deconstructing the Frankenpredictor for Implementable Branch Predictors, Apr. 2005.*
Kaeli et al., Predicting Indirect Branches via Data Compression, 1998.*
"Accurate Indirect Branch Prediction", Karel et al., 1998 IEEE, pp. 167-178.
"Microarchitecture and Performance", vol. 7, Issue 2, ISSN 1535-864X, May 21, 2003, The Intel Pentium M. Processor, pp. 21-31.
Ravi Nair, "Dynamic Path_Based Branch Correlation", IBM Thomas J. Watson Research Center; IEEE, Proceedings of MICRO- 28 1995. pp. 15 to 23.
Karel Driesen, et al., "Accurate Indirect Branch Prediction", Department of Computer Science University of California, IEEE 1998. pp. 167 to.

* cited by examiner

*Primary Examiner*—Alford W Kindred
*Assistant Examiner*—Jesse R Moll
(74) *Attorney, Agent, or Firm*—Cantor Colburn LLP; Preston Young

(57) ABSTRACT

A method, system, and computer program product are provided, for maintaining a path history register of register indirect branches. A set of bits is generated based on a set of target address bits using a hit selection and/or a hash function operation, and the generated set of bits is inserted into a path history register by shifting bits in the path history register and/or applying a hash operation, information corresponding to prior history is removed from the path history register, using a shift out operation and/or a hash operation. The path, history register is used to maintain a recent target, table and generate register-indirect branch target address predictions based on path history correlation between register-indirect branches captured by the path history register.

19 Claims, 9 Drawing Sheets

METHOD, SYSTEM, AND COMPUTER PROGRAM PRODUCT FOR PATH-CORRELATED INDIRECT ADDRESS PREDICTIONS

BACKGROUND

Exemplary embodiments relate to instruction fetch unit architecture, and more particularly to instruction fetch, branch prediction, and branch execution architecture in high-performance microprocessors.

Branch, prediction is an important aspect of efficient computer microarchitecture. It ensures that a steady supply of instructions is available for a microarchitecture with high instruction issue bandwidth in order to efficiently use the high issue bandwidth.

FIG. 1 illustrates one example of a microprocessor 100 in which instructions are fetched using instruction fetch logic (IF) from the instruction cache (IC). The instructions are processed by branch prediction logic (BP) and are passed to decoding logic D0, D1, D2, D3. Branch prediction, can effect a change in fetch direction by updating the instruction fetch address maintained in instruction fetch logic IF, if a predicted-taken branch is encountered.

Decoded instructions (both branch instructions and non-branch instructions) are transferred via transfer facility xfer to group dispatch logic (GD). Individual instructions being dispatched are renamed using register map table (MP) and entered into issue queues maintained in issue logic (ISS), depending on instruction type, to issue to the appropriate execution pipelines branch execution unit (BR) 105, load/store units (LD/ST) 110, fixed point execution (FX) 115, and floating-point execution, units (FP) 120. Instructions are issued out of order with respect to each other from issue queues maintained in issue logic (ISS).

Referring now to the execution in compute pipelines LD/ST 110, FX 115, and PR 120, instructions perform register file access to one or more register files (RF) and enter an execution phase. For LD/ST 110 instructions, the execution phase includes a first address generation phase (EA), followed by data cache access (DC) and data formatting (Fmt). For FX 115 instructions, execution includes a logic function implemented by (EX). For FP 120 instructions, execution includes one or more logic functions F1 to F6.

With respect to the execution of branch instructions in a RR 105 pipeline, branch instructions optionally perform one or more register file accesses to retrieve one or more of condition, branch, counter, and branch target operands in register file access logic (RF). Branch execution logic (EX) in the BR 105 pipeline computes the target address and branch condition, and compares them with the predicted target and condition. If a misprediction is detected, e.g., either the condition was computed incorrectly or the wrong target was supplied, a branch redirection action is taken. Mispredicted instructions are removed from execution pipelines 105, 110, 115, 120 using a flush or other appropriate mechanism, and the fetch address maintained in instruction fetch logic (IF) is updated.

All execution pipelines 105, 110, 115, 120 complete by performing a writeback (WB) of computed results and a transfer via xfer to a commit stage (CP).

Instructions are committed at their in-order commit point, by commit stage (CP) in-order relative to all other instructions. Interrupt, conditions, exceptions, and other special execution conditions cause a flush and refetch to be effected by the commit stage (CP), and the instruction fetch address in instruction fetch logic (IF) is set to one of a re-execution, an interrupt, or an exception handler address.

High branch prediction accuracy is of further importance to ensure that instructions having been fetched and executed predictively correspond to the actual program execution path, such that predictively executed instructions speed up execution of the overall program.

While great strides have been made in the prediction of conditions for conditional branches and for target addresses of function returns, accurately and efficiently predicting target addresses has been a problem for those skilled in the art.

FIG. 2 illustrates a first register indirect branch target prediction technique that uses a lookup table of values (recent target table RTT 220) Indexed by an instruction fetch address register (IFAR) 210 to retrieve the target address prediction 230 of the most recent target for the branch at the specified address.

Usually, arrays of an RTF 220 may support from 8 to 256 entries, which leads to destructive aliasing of entries sharing the same set of address bits that are used for indexing into the recent target table RTT 220 or otherwise used for mapping to the same entry in the RTT 220.

Consequently, in FIG. 2, the accuracy of this branch predictor is limited. While this branch predictor can maintain a single element of history for a limited set of indirect branches, it cannot detect patterns. Thus, while the RTF 220 is an efficient means for handling inter-module linkage calls, and other fixed target calls, this branch predictor is not adapted to detecting patterns.

FIG. 3 illustrates an indirect branch predictor (IBP) 300 that chooses targets 310 based on a global control flow history 320, much the same way a global branch predictor chooses the direction of conditional branches using global control flow history. As seen in FIG. 3, it is an adjunct to the normal target prediction device. Targets are always allocated in the instruction pointer tagged table 335 along with the type of branch. When a misprediction occurs due to a mispredicted target on an indirect branch, the indirect branch predictor 300 allocates a new entry in table 325 corresponding to the global history 320 leading to this instance of the indirect branch. This construction allows monotonic indirect branches to predict correctly from the IP-based target array 335 (accessed with instruction pointer 330) and allows data-dependent indirect branches to allocate as many targets as they may need for different global history patterns, which correlate with the different targets. Entries in the indirect branch predictor 300 are tagged with the hit and type information in the IP-based target array 335 (and accessed with instruction pointer 330) to prevent false positives from the indirect branch predictor 300 to lead to new sources of target mispredictions.

The indirect branch predictor architecture in FIG. 3 uses two branch prediction tables. A large table RTF 335 (e.g., accessed with instruction pointer 330) and a global history-based correlated smaller predictor 325 (e.g., using global history 320) allow detection of patterns based on directional history of global history 320. Since the global history 320 consists of directional history, the architecture depicted in FIG. 3 suffers because, in many applications, branch correlation on direction history is not high for register indirect branches, and branches with a common global history are forced to share entries in this architecture.

Thus, what is needed is a method for efficient low complexity implementation of a register indirect predictor based on correlation with the outcome of a sequence of register-indirect branches, allowing efficient prediction of speculatively executed indirect branches. What is also needed is a means to support a variety of workloads, containing branches correlated on target address history, those correlated on directional history, and those showing little or no correlation to history, but rather having static behavior depending on instruction address of the register indirect branch. What is further needed is a way to provide efficient and fast recovery in the event of a branch misprediction.

SUMMARY

In accordance with one exemplary embodiment, a method for maintaining a path history register is provided. A set of bits is generated based on a set of target address bus using a bit selection and/or using a hash function operation. The generated set of bits is inserted into a path history register by shifting bits in the path history register and/or by applying a hash operation. Information corresponding to prior history is removed from the path history register, using a shift out operation and/or a hash operation.

In accordance with another exemplary embodiment, a computer program product is provided that includes a computer useable medium having a computer readable program that, when executed on a computer, causes the computer to maintain a path history register. The computer readable program causes the computer to generate a set of bits based on a set of target address bits using a bit selection and/or a hash function operation. The computer readable program also causes the computer to insert the generated set of bits into a path history register by shifting bits in the path history register and/or by applying a hash operation. Also, the computer readable program causes the computer to remove information corresponding to prior history from the path history register, using a shift out operation and/or a hash operation.

In accordance with another exemplary embodiment, a system is provided. The system includes a recent target table and a processor having a path history register. The path history register is operatively coupled to the recent target table to produce a target address prediction for an indirect branch. The processor is configured to generate a set of bits based on a set of target address bits using a bit selection and/or using a hash function operation, and the processor is configured to insert the generated set of bits into the path history register by shifting bits in the path history register and/or by applying a hash operation. Further, the processor is configured to remove information corresponding to prior history from the path history register, using a shift out operation and/or a hash operation.

Additional features and advantages are realized through the techniques of the present disclosure. Exemplary embodiments are described in detail herein. For a better understanding of the advantages and features disclosed herein, reference is made to the description and to the drawings.

BRIEF DESCRIPTION OF THE DRAWINGS

The subject matter, which is regarded as novel, is particularly pointed out and distinctly claimed in the claims at the conclusion of the specification. The foregoing and other features and advantages of the present disclosure are apparent from the following detailed description taken in conjunction with the accompanying drawings in which:

The detailed description describes exemplary embodiments, together with advantages and features, by way of example with reference to the drawings.

DETAILED DESCRIPTION OF EXEMPLARY EMBODIMENTS

Figure 1:
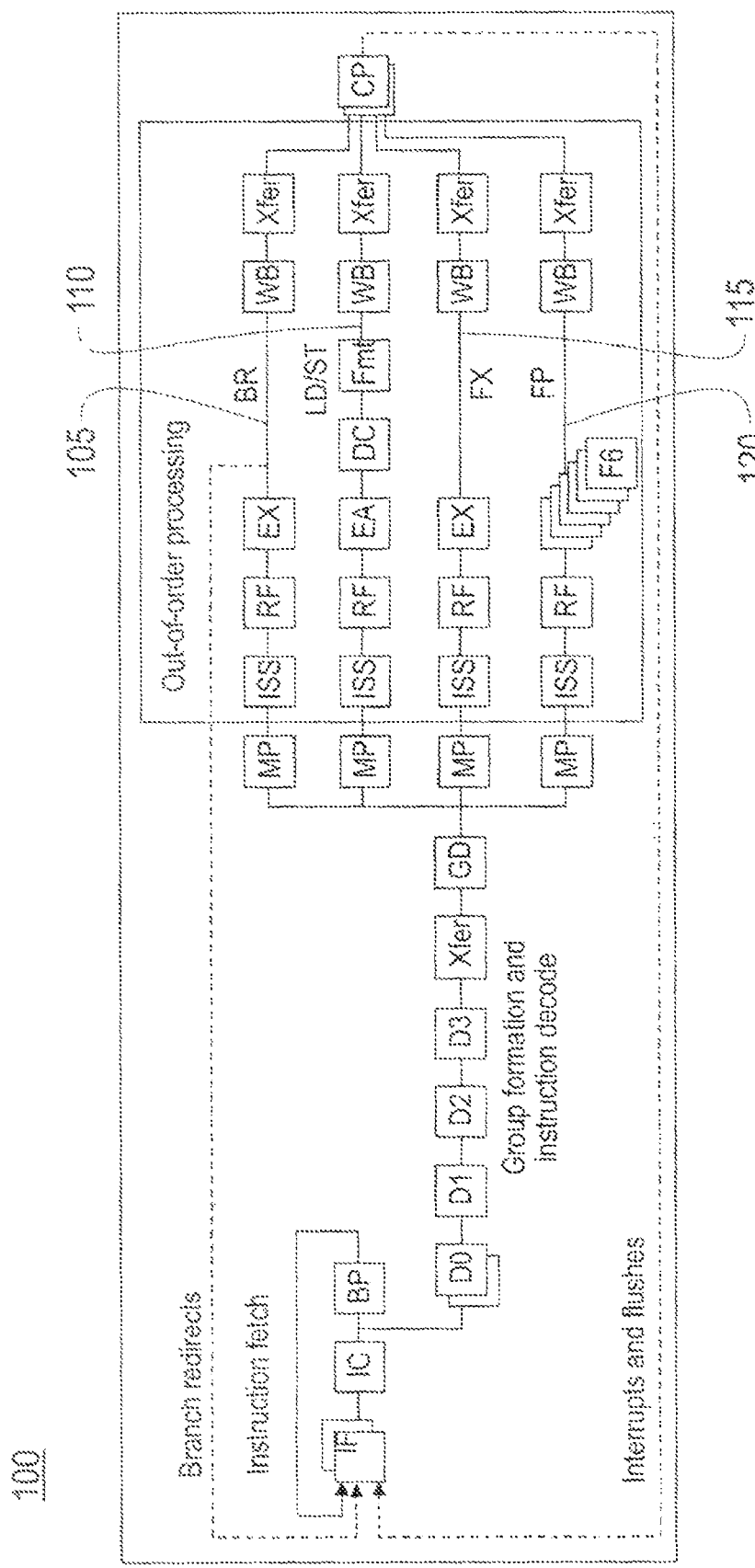
FIG. 1 illustrates a state-of-the art microprocessor.
Figure 2:
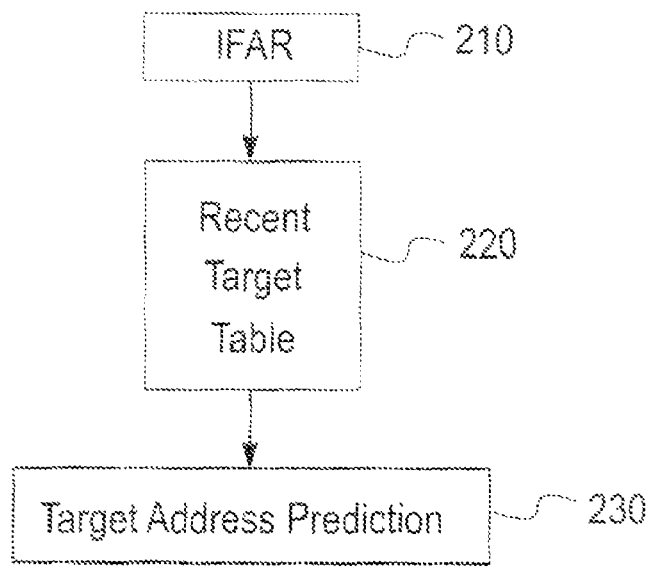
FIG. 2 illustrates an example of a predictor for indirect target branches.
Figure 3:
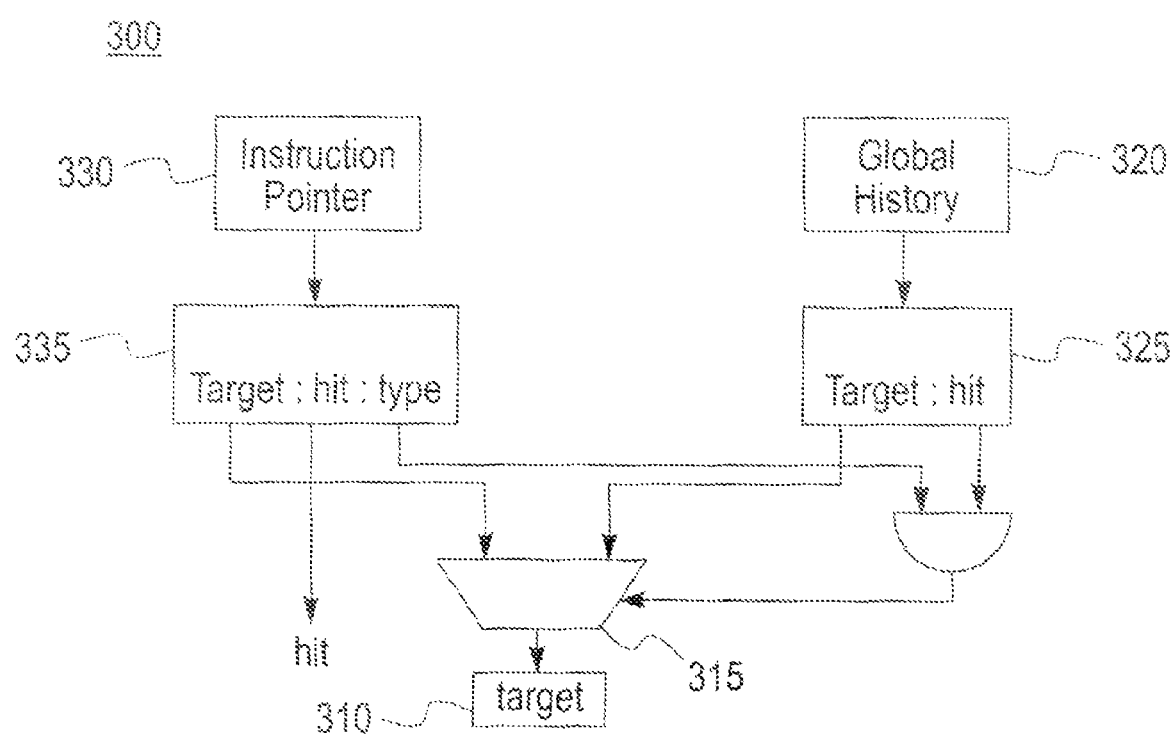
FIG. 3 illustrates an example of an indirect branch predictor.
Figure 4:
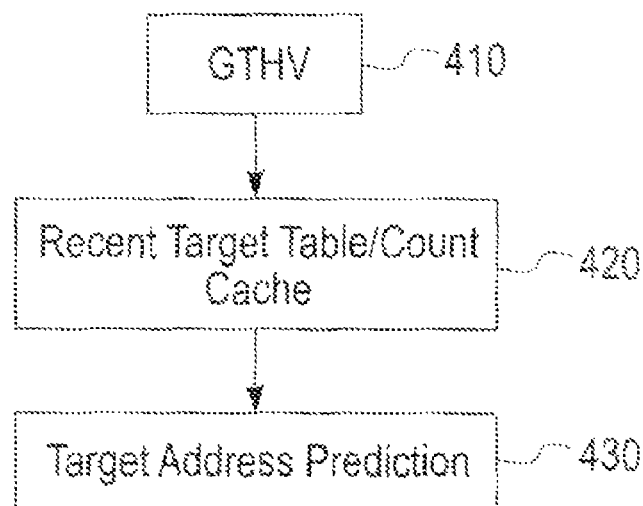
FIG. 4 illustrates an exemplary embodiment in which a global target history vector (GTHV) is used to access a recent target table (RTF)

FIG. 4 illustrates an exemplary embodiment of a system for accessing a recent target table (RTT) 420 based on correlation with a path history register (also referred to as a "global target history vector" GTHV 410) for generating a target address prediction result 430.

In one exemplary embodiment, the recent target table (RTT) 420 may be implemented in a static RAM technology. Those skilled in the art will understand that other memory technologies, such as latches, register files, embedded DRAM, and/or other storage technologies, may be used in conjunction with the features discussed herein.

In one exemplary embodiment, the RTF 420 may be accessed using a direct mapped access strategy based on the GTHV 410, and the RTF 420 may be implemented using a tagless lookup (table). In another exemplary embodiment, multiple entries (values) may be returned by a single lookup, and a tag match is used to select one of the numerous values returned. Those skilled in the art understand that a portion of a GTHV 410 or of the branch instruction address, or a combination of the two may be used as a tag in accordance with the present disclosure.

With respect to branch instructions in the Power Architecture™, general indirect branches are executed using the "branch to count register" bcctr instruction. A second type of register-indirect branch, "branch to link register" belt, is predicted using a return stack predictor in accordance with the Power Architecture™ and its programming environments.

In one exemplary embodiment of maintaining the path history register (GTHV 410) on a Power Architecture™ processor, the path history register contains bits corresponding to a plurality of bits from one, two, or more prior targets of the taken bcctr branches in accordance with the Power Architecture™.

Those skilled in the art understand that, a path history register can be practiced in conjunction with a variety of architectures, by identifying one or more types of branch instructions corresponding to general indirect control flow. Thus, for example, the use of the path history register may differ based on opcodes, based on target registers (e.g., used to differentiate between general register-indirect branches, and those used for function return), or based on a predictor when multiple target address predictors are present.

Global target history vector (GTHV 410) may be considered as a general term related to a path history register corresponding to target, address values from one or more prior indirect branches. In one exemplary embodiment, this may correspond to a history of target addresses from a branch to count register instruction. In another exemplary embodiment, this history can encompass the target addresses of all register indirect branches regardless of the architecture and of whether the architecture uses a count register or other means to identify a general indirect branch. Similarly, unless otherwise indicated, die "branch to count" may be considered as an exemplary general indirect branch, regardless of what register is used to indicate the branch target. Likewise, in some complex instruction set computer (CISC) architectures, branch to register double indirect or branch from memory absolute instructions may be available and be used to implement general indirect branches within the scope of the present disclosure. In another exemplary embodiment, generalized multi-target branches may be treated as indirect branches, in which their use and behavior may show beneficial correlation with the GTHV path history.

Those skilled in the art understand the Power Architecture™ and understand that branch hint bits BH can direct a processor to not predict a specific bcctr branch using register indirect prediction, and/or to predict specific heir branches using register indirect prediction. In one exemplary embodiment, BH bits may be properly interpreted to alter the behavior of bcctr and heir branches so as to be one of included and not included in the GTHV. Those skilled in the art will furthermore understand that the addresses to be incorporated in a branch history can be identified by hint bits embedded in the branch instruction to include some branches, and exclude other branches, from the GTHV, in an architecture with generalized register-indirect branch instructions.

Figure 5:
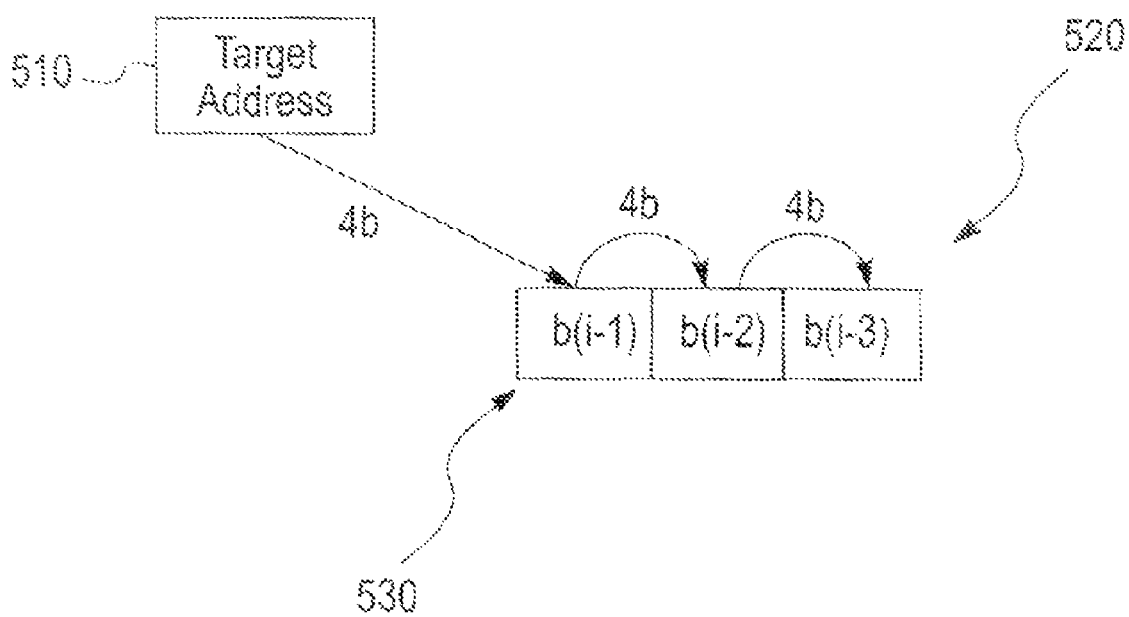
FIG. 5 illustrates an exemplary embodiment of maintenance of a global target history vector (GTHV), by giving equal weight to history elements.

FIG. 5 illustrates an exemplary embodiment of an implementation of a global target history vector (GTHV) update in response to executing an indirect branch instruction. The maintenance of the GTHV 520 gives equal weight to history elements 530 (i–1, i–2, i–3 . . . ).

In a non-limiting example, executing an indirect branch instruction may encompass the prediction of a branch in the instruction fetch, frontend, and the simultaneous update of the GTHV based on the predicted target address. In another non-limiting example, executing an indirect branch instruction may encompass branch misprediction recovery during branch execution, when a previously mispredicted branch has been detected.

In FIG. 5, a GTHV 520 is defined by the history depth corresponding to how many recent, indirect branches are tracked in the GTHV 520 and to the size of history elements 530. The GTHV 520 contains, for example, three history elements 530 corresponding to 4 bits from the previous indirect branch b(i–1), 4 bits from the indirect branch b(i–2) prior to the previous indirect branch b(i–1), and 4 bits from oldest indirect branch b(i–3). The GTHV 520 is not limited to a history depth of 3, and the history depth may be increased or decreased as needed. Also, the GTHV 520 is not limited to storing 4 bits (4 b) of data related to the target address 510.

In the operation of apparatus GTHV 520, when an indirect branch is predicted, the value of the GTHV 520 history element b(i–2) is copied to GTHV 520 history element b(i–3), the value of GTHV 520 history element b(i–1) is copied to GTHV 520 history element b(i–2), and bits corresponding to the target address 510 of the currently executed indirect branch are stored as a new value of GTHV 520 history element b(i–1). Moreover, if a register indirect branch is predicted, a set of target address bits is selected from the target address 510, and a shift is performed in GTHV 520. Those skilled in the art will understand that an update of the GTHV during prediction corresponds to the maintenance of a speculative GTHV, to support multiple speculative indirect branch predictions. In other embodiments, GTHV updates may occur during branch execution. Furthermore, GTHV updates can also be performed during branch misprediction recovery in at least one embodiment.

The bits selected for insertion into the most recent history element 530 (e.g., b(i–1)) may be selected from a variety of locations such as the low order bits of the target address 510, a middle range of bits from the target address 510, or the high order bits of the target address 510, and the bits selected for insertion are likely decided at design time based on the address space configuration and workload behavior in target systems. Low, middle range bits (but not the least significant bits which are often 0 because of alignment introduced by programmers and compilers) provide a good set of indicators of path history for a variety of workloads. In one exemplary embodiment, the bits selected may be a contiguous range of bits in the target address 510. In another exemplary embodiment, the bits selected may not be a contiguous range of bits in the target address 510.

Figure 6:
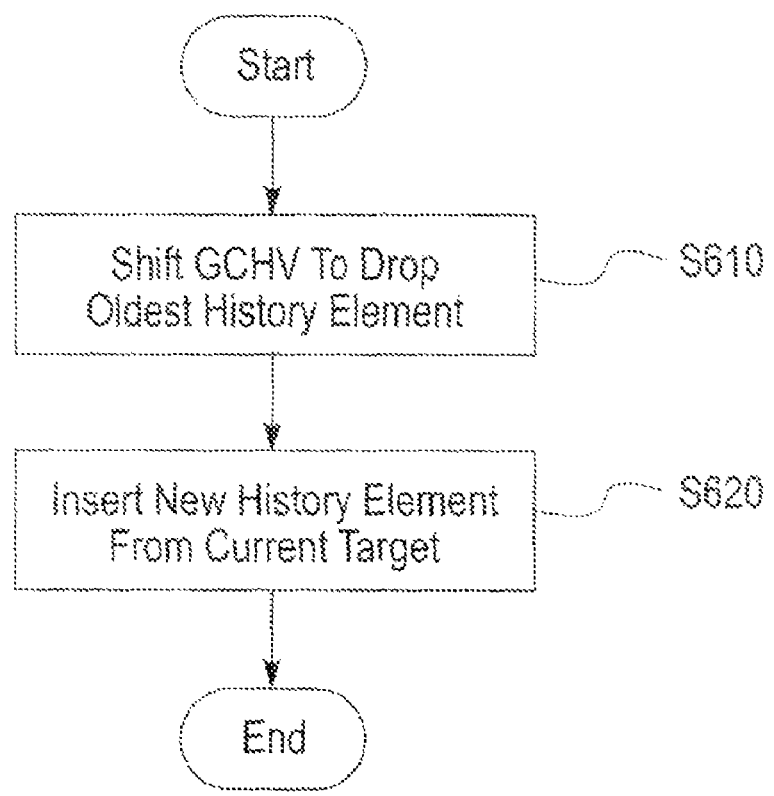
FIG. 6 illustrates an exemplary embodiment of a method for maintenance of a global target history vector (GTHV)

FIG. 6 illustrates an exemplary embodiment of GTHV maintenance update operations. These operations may be practiced in conjunction with the apparatus of FIG. 5.

The method starts with step S610. The GTHV is shifted to drop the oldest history element from the GTHV (S610).

A number of bits is selected from the current target address of an indirect branch and inserted into the most recent history element of the GTHV (S620). The method ends. Any history elements that may be interposed between the most recent history element and the oldest history element are shifted accordingly.

Figure 7:
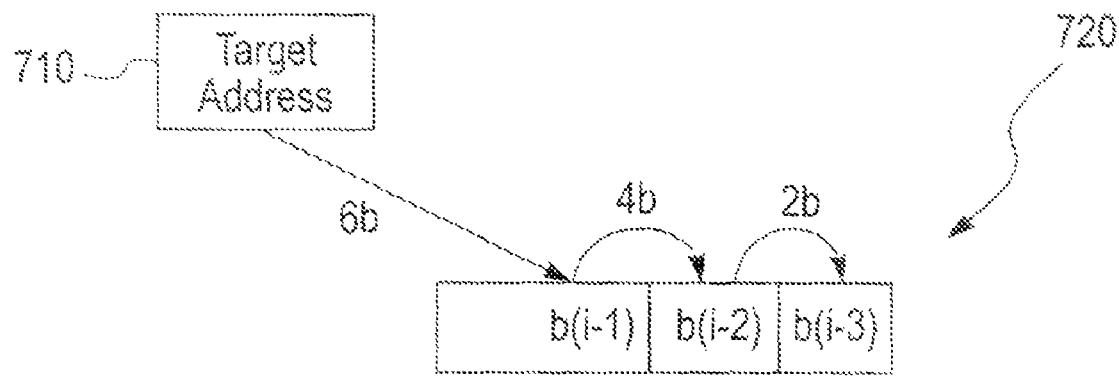
FIG. 7 illustrates an exemplary embodiment of a global target history vector (GTHV) giving greater weight to more recent history elements.

FIG. 7 illustrates an exemplary embodiment of an apparatus for maintaining an asymmetric GTHV where more recent history elements are allocated more bits within the GTHV than older history elements. In accordance with this exemplary embodiment, a most recent. GTHV 720 history element b(i–1) contains 6 bits (6 b) selected from a target address 710, a GTHV 720 history element b(i–2) contains 4 bits (4 b), and a GTHV 720 history element b(i–3) contains 2 bits (2 b).

When an update shift is performed by the GTHV 720 of FIG. 7, only a subset, of bits is copied from each history element (e.g., b(i–2)) to the next older history element (e.g., b(i–3)).

More specifically, when an indirect branch instruction is executed, a subset of bits corresponding to the value of GTHV 720 history element b(i–2) is copied to GTHV 720 history element b(i–3), a subset of bits corresponding to the value of GTHV 720 history element b(i–1) is copied to GTHV 720 history element b(i–2), and bits corresponding to the target address 710 of the currently performed indirect branch are stored as a new value of GTHV 720 history element b(i–1).

Those skilled in the art will understand that a range of sizes and configurations are possible for an asymmetric GTHV 720. An asymmetric GTHV offers attractive properties when correlation in a workload is stronger on more recent indirect branch target addresses. Although a history depth of 3 has been discussed herein, the GTHV may be designed to have a history depth of more than (or less than) 3.

Figure 8:
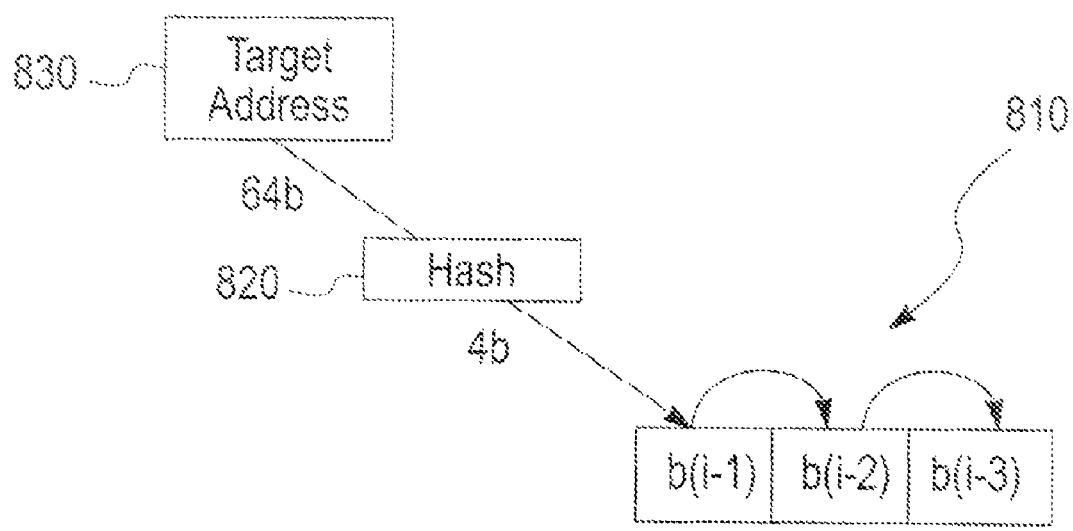
FIG. 8 illustrates an exemplary embodiment of hashing a target address being, shifted into a global target history vector (GTHV)

FIG. 8 illustrates an exemplary embodiment of an apparatus employing a hash function to generate a GTHV 810 history element based on at least one bit from an indirect branch target address 830. Using a hash function 820 based on hits from a branch target address 830 allows the GTHV 810 to summarize many more bit positions of a branch target address 830 than is possible by selecting distinct bits. The hash function 820 is used to compress the size of a larger set of bits. Thus, for example, the hash function 820 compresses 64 bits (64 b) from target address 830 into 4 bits (4 b) for the GTHV 810. Using a hash function 820 also allows the GTHV 810 to balance the need to use low order bits to reflect the indirect branch behavior of table jumps within a module, and higher-order bits to reflect indirect branches between modules.

Figure 9:
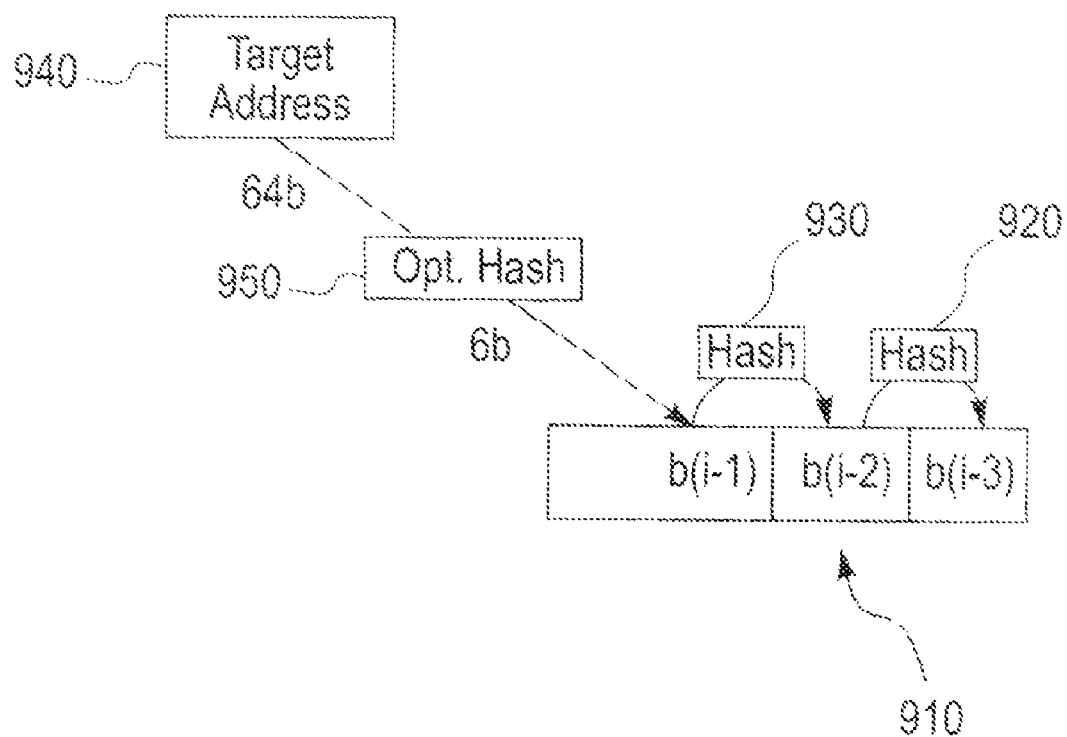
FIG. 9 illustrates an exemplary embodiment of hashing a global target history vector (GTHV) during shift.

FIG. 9 illustrates an exemplary embodiment of using a hash function to compress the size of history elements for an asymmetric GTHV which gives greater weight to more recent entries. Employing a hash function to compress the size of the history elements, rather than using a subset of bits from history element j for history element j−1 in accordance with the apparatus of FIG. 7, allows preservation of additional history information.

More specifically, when an indirect branch instruction is executed, a first hash function 920 is applied to the value of GTHV 910 history element b(i−2) and the result is copied into GTHV 910 history element b(i−3), and a second hash function 930 is applied to the value of GTHV 910 history element b(i−1) and the result is copied into GTHV 910 history element b(i−2). The bits corresponding to the target address 940 of the currently performed indirect branch are stored as a new value of the GTHV 910 history element b(i−1).

The apparatus in FIG. 9 may be practiced in conjunction with selecting a set of bits from an indirect target address 940 to generate a most recent GTHV 910 history element b(i−1) by using optional hash 950 or by using a hash function in accordance with the apparatus of FIG. 8 to correlate on a wider range of address bits in a hashed form. For example, the optional hash 950 may hash 64 bits (64 b) from the target address 940 into 6 bits (6 b) for the most recent GTHV 910 history element b(i−1).

Figure 10:
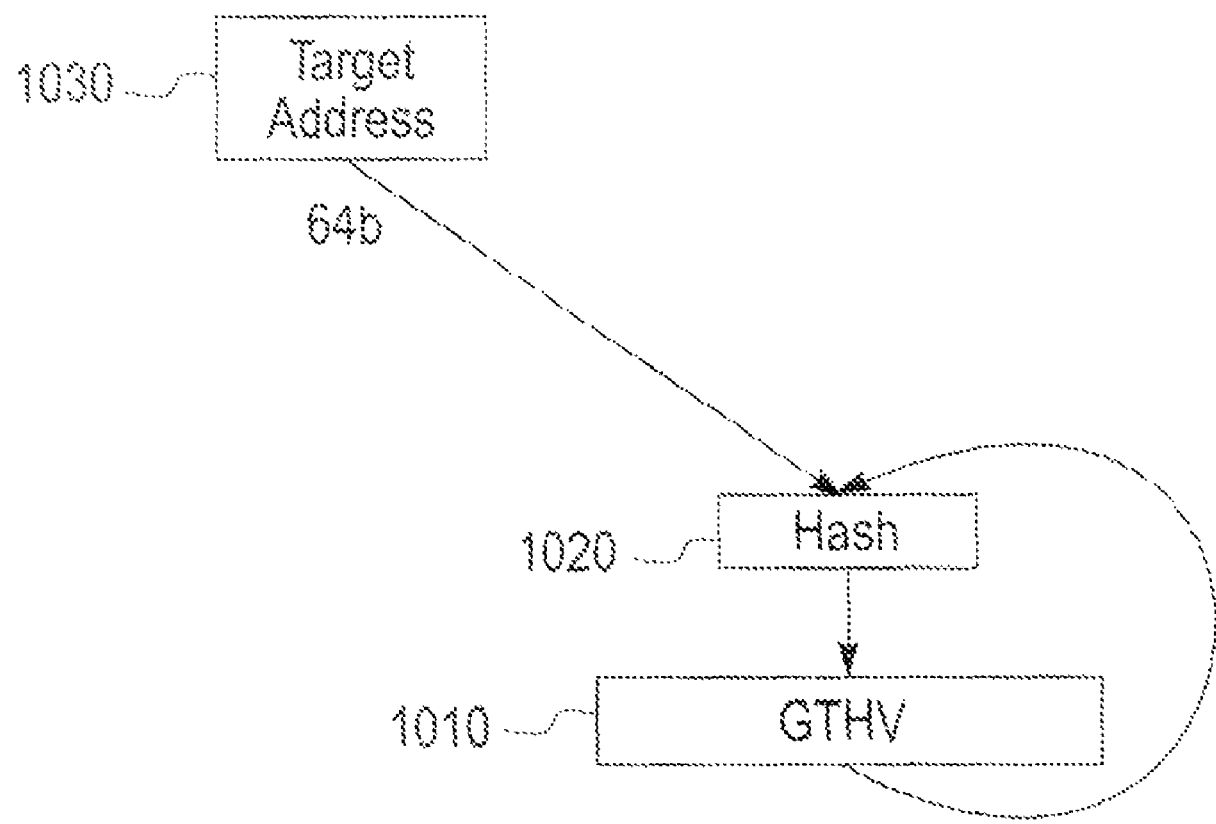
FIG. 10 illustrates an exemplary embodiment of computing a new global target history vector (GTHV) based on a target address and a prior global target, history vector (GTHV) value.

FIG. 10 illustrates an exemplary embodiment of an apparatus for a hash-based update of a GTHV, in which no distinct history elements are readily discernable in the apparatus. When an indirect target branch is performed, a new GTHV 1010 is computed based on performing a hash function 1020 on at least one bit of the prior GTHV 1010 and one bit of the target address 1030. If desired, the new GTHV 1010 may be computed using more than one bit of either the prior CGHV 1010 or the target address 1030. For example, 64 bits (64 b) of the target address 1030 may be hashed with bits from GTHV 1010 to generate a new value for the GTHV 1010. As a non-limiting example, computing the new GTHV 1010 may be represented by the following:

GTHV_new <=hash_update (GTHV_old, indirect_target_address). (Equation 1)

Therefore, a new GTHV 1010 may be determined as a function of the old GTHV 1010 and the target address 1030.

Figure 11:
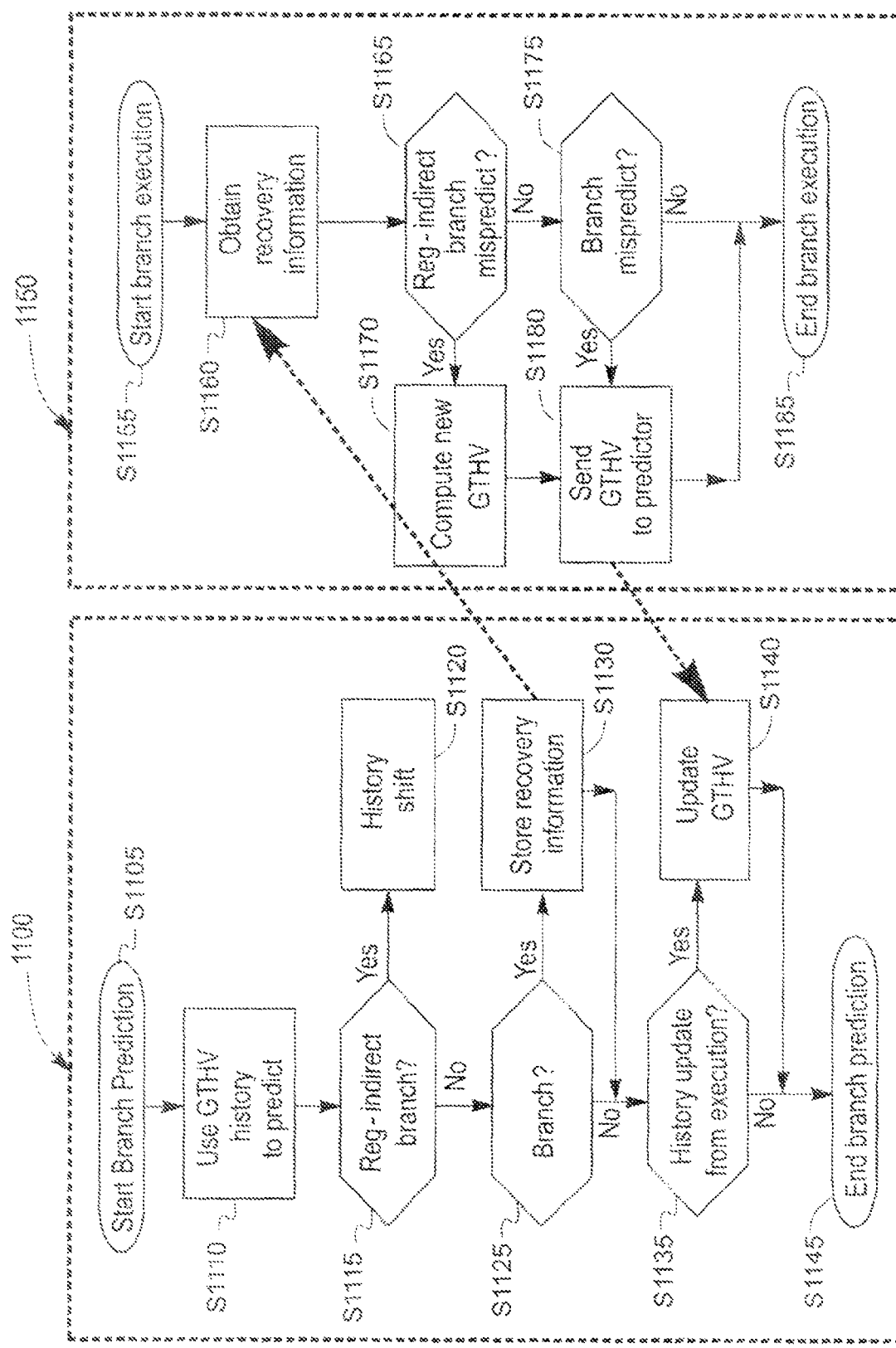
FIG. 11 illustrates an exemplary embodiment of the management of a global target history vector (GTHV) in a highly parallel microprocessor with speculative instruction fetch.

FIG. 11 illustrates an exemplary embodiment of a method for the management of a GTHV. The management of the GTHV may operate in a highly parallel out of order microprocessor with speculative fetch frontend, out-of-order execution of branch execution, and in-order completion.

FIG. 11 may be considered as two independent but interlocking methods 1100 and 1150 (or as a single method) operating in a first speculative fetch frontend of the microprocessor, and a second out-of-order branch execution backend of the microprocessor, respectively. In accordance with these interlocking methods, the first method 1100, executing in the speculative fetch frontend and performing branch prediction, stores recovery information in a branch information queue (BIQ) accessible by the branch execution logic. The first method 1100 may be used to verify both correctness of prediction and to initialize recovery.

The second method 1150, executing in the branch execution logic, uses information in the branch information queue (BIQ) to generate new GTHV values when a misprediction is detected. The second method 1150 may be used to re-initialize the GTHV vector maintained in the speculative fetch frontend. The interlocking methods 1100 and 1150 are described below. The method 1100 in the speculative fetch and branch prediction frontend starts (S1105). The GTHV is used to make a branch prediction (S1110). A check is performed to determine whether an indirect branch is present and is predicted to be taken (S1115). If the answer is affirmative, a history update is performed (S1120) which may be in accordance with any of the history apparatuses and operations of FIGS. 5-10 (S1120). If the answer is negative, a check is performed (S1125) to determine whether a branch is being predicted (S1125). If a branch is being predicted, recovery information is stored and made available for use during recovery if a mispredicted branch has been discovered (S1130).

If it is determined at S1125 that a branch is not being predicted, or if recovery information was stored at S1130, a check is performed, to determine whether the GTHV history needs to be updated in response to a misprediction detected by branch execution logic (S1135). If a history update is needed, the GTHV is updated based on a new GTHV computed by branch execution, logic (S1140). If no history update is needed or if the GTHV was updated, the branch prediction ends (S1145). Referring now to the method 1150 executing in conjunction with the branch execution logic, the operations begin (S1155). Recovery information previously stored (S1130) during the GTHV maintenance method 1100 in the frontend is retrieved (S1160). A check, is performed to determine whether an indirect branch target address was mispredicted (S1165). If an indirect branch target address was mispredicted, a new GTHV is computed based on the corrected indirect branch target address (S1170). If an indirect branch target address was not mispredicted, a check is performed to determine if another type of branch misprediction (such as a condition mispredictions for a conditional branch) has occurred (S1175).

If it is determined at S1175 that a branch misprediction has occurred, or if a new GTHV is computed (S1170), the method 1150 transmits a GTHV which corresponds to either the in-order value of the GTHV of a mispredicted branch or the updated in-order value of a mispredicted indirect branch to method 1100 (S1180), and the GTHV is updated in accordance with the operations of method 1100 (S1140). If there is no branch misprediction or if the GTHV was sent to method 1100, the branch execution ends (S1185).

Figure 12:
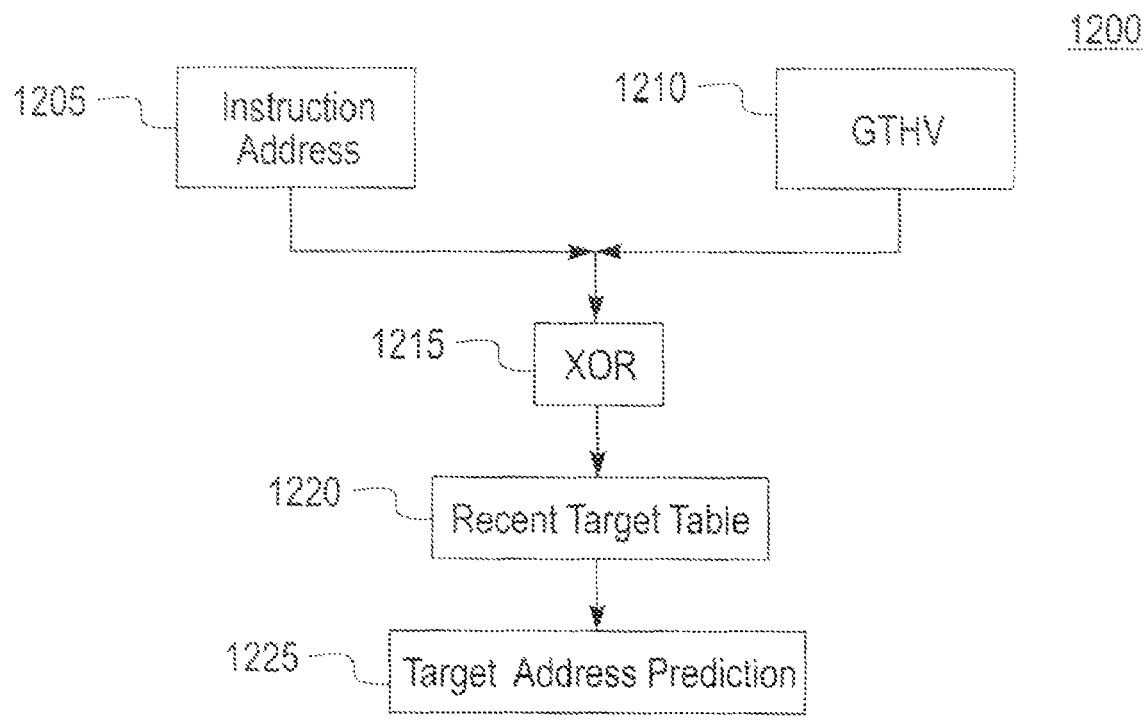
FIG. 12 illustrates an exemplary embodiment of an indirect branch predictor correlating an instruction address and global target history vector (GTHV)
Figure 13:
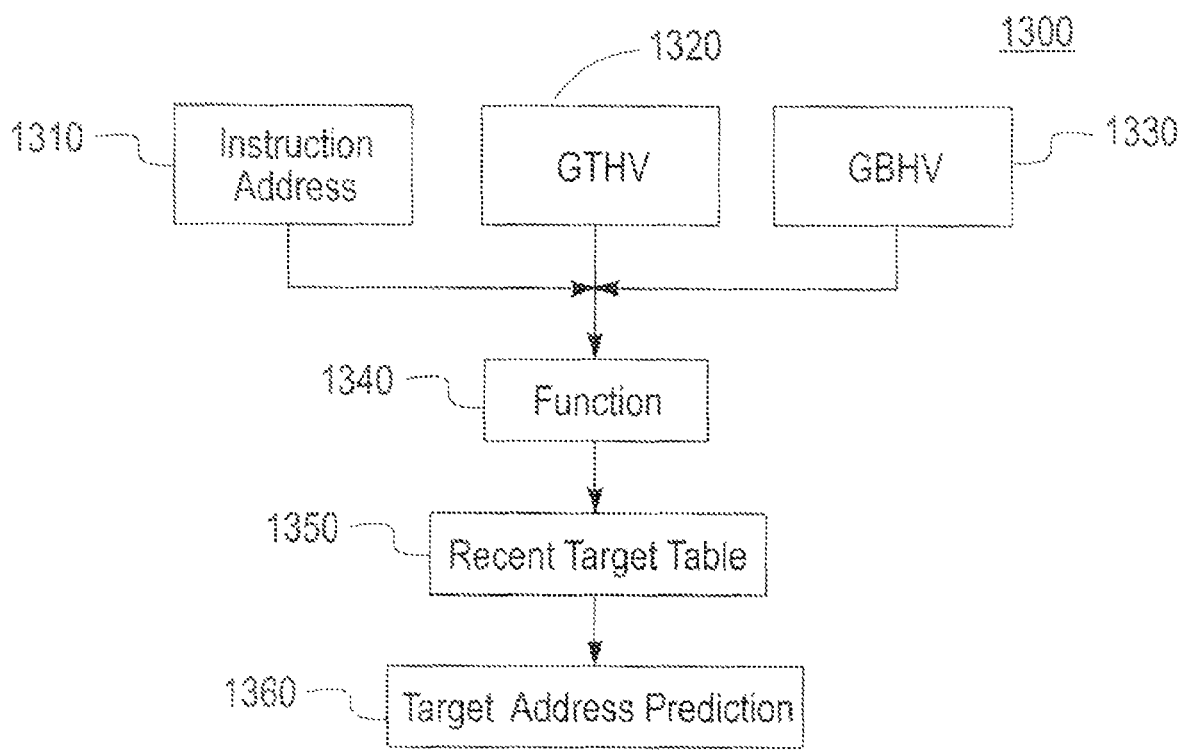
FIG. 13 illustrates an exemplary embodiment of a branch predictor correlating an instruction address register, a global target history vector (GTHV), and a global branch history vector (GBHV)
Figure 14:
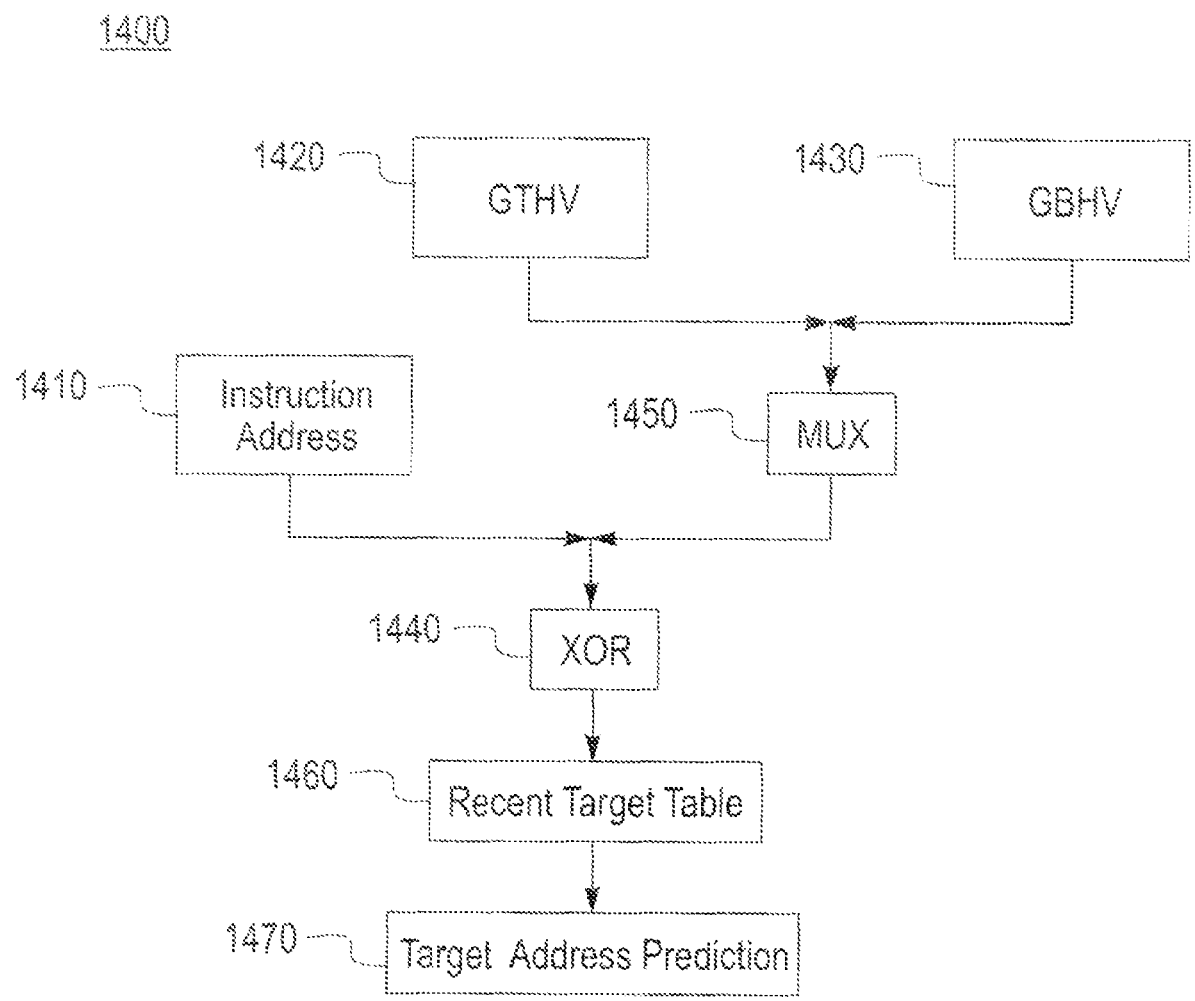
FIG. 14 illustrates an exemplary embodiment of a polymorphic indirect target predictor.

Those skilled in the art will understand that, while the operations illustrated in FIGS. 12-14 are described as implementations for GTHV maintenance, RTT maintenance occurs concurrently with GTHV maintenance. For example, in one exemplary embodiment, operation S1110 may include accessing the RTF using the GTHV. Similarly, if the answer to operation S1165 indicates that an indirect branch target address misprediction has occurred, such an occurrence induces an update of the RTF to correct the prediction based on a recovery GTHV. In addition, pipeline flushes and refetch initiation may occur in response to mispredictions, particularly in response to a branch misprediction.

Therefore, those skilled in the art will understand that other methods and mechanisms operate in conjunction with these methods, so as to flush erroneously fetched instructions from the microprocessor pipeline and re-start fetch in response to a branch misprediction, and to update prediction tables, as necessary. In addition, other branch prediction circuitry targeted at maintaining predictors for return address stacks, directional prediction, etc., may be included.

For clarity, the operations of FIG. 11 have been described as two methods 1100 and 1150 working in tandem. However, the operations of the two methods may be merged and function as a single process. FIG. 12 illustrates an exemplary embodiment of a prediction apparatus that correlates indirect branch predictions on both a branch instruction address and a GTHV vector. In accordance with the prediction apparatus 1200 of FIG. 12, an instruction address 1205 and a GTHV 1210 are combined by XOR logic 1215 to generate an access value for an RTF 1220. The lookup in RTF 1220 generates a target address prediction output 1225.

Further, in one exemplary embodiment, the access value may be used as an index into a direct mapped RTF. In another exemplary embodiment, a portion of the access value may be used as an index, and a second portion may be used as a tag to select, between multiple entries returned per line in a set-associative RTT.

Those skilled in the art are familiar with the design of set associative caching structures and understand how to practice the set associative RTT in accordance with the present disclosure.

Also, those skilled in the art understand that, for example, functions (or devices) other than XOR may be used to combine an instruction address 1205 and a GTHV 1210.

FIG. 13 illustrates an exemplary embodiment of a prediction apparatus which correlates indirect branch predictions on a branch instruction address, a GTHV vector, and a directional global branch history vector GBHV receding a history of direction decisions for condition branches, in accordance with a prediction apparatus 1300, an instruction address 1310, a GTHV 1320, and a GBHV 1330 are combined by a function 1340 to generate an access value for an RTT 1350. In one exemplary embodiment the access value may be used as an index into a direct mapped RTF. In another exemplary embodiment; a portion of the access value may be used as an index, and a second portion may be used as a tag to select between multiple entries returned per line in a set-associative RTT. The lookup of RTT 1350 generates a target address prediction, output 1360.

Those skilled in the art understand that a variety of functions may be used for function 1340. For example, in one exemplary embodiment, correlation inputs may be combined using an XOR function, in another exemplary embodiment, function 1340 may be fixed. In one exemplary embodiment, function 1340 may be implemented with configurable gates (e.g., FPGA-like structures). In yet another exemplary embodiment, function 1340 may be implemented as a fixed function with at least one configuration parameter.

In one exemplary embodiment of a fixed function 1340 with a configuration parameter, the selection function may be included in the definition of function 1340, such as the exemplary selection_xor function:

access_value<=(IA and select_IA) XOR (GTHV and select_GTHV) XOR (GBHV and select_GBHV). (Equation 2)

Those skilled in the art understand that this function may be used to correlate on any single function input, by selecting the function input and deselecting all other inputs. The function may also be used to correlate on the XOR combination of any combination of input functions.

FIG. 14 illustrates an exemplary embodiment of an apparatus 1400 executing indirect branch prediction correlation on an instruction address 1410 and at least one of a GTHV 1420 and GBHV 1430. Instruction address 1410 is operatively connected to one input of XOR function 1440. GTHV 1420 and GBHV 1430 are operatively connected to a multiplexer 1450 to select a history vector for indirect branch correlation. Multiplexer 1450 is operatively connected to a second input of XOR function 1440. XOR function 1440 generates an access value for RTT 1460. In one exemplary embodiment, the access value may be used as an index into a direct mapped RTT. In another exemplary embodiment, a portion of the access value may be used as an index, and a second portion of the access value may be used as a tag to select between multiple entries returned per line in a set-associative RTT. The lookup of RTT 1460 generates a target address prediction output 1470.

Those skilled in the art understand that the selection_xor function may be used to implement a selective correlation on a GTHV 1420 or a GBHV 1430 in accordance with FIG. 14, wherein;

Select_IA<='1'; (Equation 3)

select_GTHV<=select_GTHV_or_GBHV; and (Equation 4)

select_GBHV<=NOT select_GTHV_or_GBHV. (Equation 5)

With respect to an indirect branch prediction method and apparatus based on a configurable function 1340 and/or based on FIG. 14, polymorphic configurations of a microprocessor indirect branch prediction apparatus may adapt the microprocessor operations to the specific characteristics of a specific branch, of a specific application, of a specific class of application, or of a specific microprocessor use environments.

In one exemplary embodiment, polymorphic selection of the generation of an access value for the RTF may be controlled by decoding the opcode of an indirect branch instruction or by reading an operation field of an indirect branch instruction.

In another exemplary embodiment, the configuration for a particular branch may be controlled by a pragma (which may be a directive written into the source code that tells the compiler to compile the program in some fashion that differs from the default method) or other directive inserted by the programmer. In another exemplary embodiment, a control file, an assembler, a compiler, or a linker parameter may control the configuration for a particular branch, in one exemplary embodiment, the compiler may select the best configuration based on profile-directed feedback.

In another exemplary embodiment, all branches within an application may share a common configuration, in this exemplary embodiment, the configuration for a particular application may be controlled by a pragma or other directive inserted by the programmer. In another exemplary embodiment, a control file, an assembler, a compiler, or a linker parameter may control the configuration for a particular branch. Linkage rules governing the interlinkage of modules compiled with different parameters are necessary in some environments. In another exemplary embodiment, the compiler selects the best configuration based on profile-directed feedback. In one exemplary embodiment, the configuration is saved and restored on context switches between, applications and/or partitions, by the operating system and hypervisor, respectively.

In another exemplary embodiment, the configuration is selected for the entire core, partition, and system, either by firmware, hypervisor, or operating system.

Those skilled in the art will understand, that in block-based fetch, instruction address, path history register GTHV, and branch history register GBHV may correspond to the block containing a branch, and not a specific branch.

As a non-limiting example, one or more features of the present disclosure may be included in an article of manufacture (e.g., one or more computer program products) having, for instance, computer usable media. The media may have embodied therein, for instance, computer readable program code means for providing and facilitating the capabilities of the present disclosure. The article of manufacture may be included as a part of a computer system or sold separately.

Additionally, at least one program storage device readable by a machine, tangibly embodying at least one program of instructions executable by the machine to perform the capabilities of the present disclosure may be provided.

The exemplary embodiments depicted herein are just examples. There may be many variations to these diagrams, methods, or steps (or operations) described herein without departing from, the spirit of the present disclosure. For instance, the operations may be performed in a differing order, or operations may be added, deleted or modified. All of these variations are considered a part of the claimed invention.

While exemplary embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A method for maintaining a path history register, the method comprising:
   generating a set of bits based on a set of target address bits from a register-indirect branch instruction using a bit selection and a hash function operation;
   inserting the generated set of bits into a path history register by shifting bits in the path history register and applying a hash function operation; and
   removing information corresponding to prior history from the path history register, using a shift out operation and a hash function operation;
   wherein removing information corresponding to prior history from the path history register, using the shift out operation and the hash function operation comprises:
      applying a first hash function operation to a value of a next to an oldest history element and copying a result of the first hash function operation into the oldest history element during the shift out operation;
      applying a second hash function operation on a value of a recent history element and copying a result of the second hash function operation into the next to the oldest history element during the shift out operation; and
      applying a third hash function operation on the set of target address bits and copying a result of the third hash function operation into the recent history element during the shift out operation;
   wherein the result of the first hash function operation is less bits than the result of the second hash function operation; and
   wherein the result of the second hash function operation is less bits than the result of the third hash function operation.

2. The method of claim 1, wherein:
   a prior history of the path history register comprises a plurality of elements,
   each of the plurality of elements corresponds to one set of target address bits, and
   each of the plurality of elements have the same size.

3. The method of claim 1, wherein:
   a prior history of the path history register comprises a plurality of elements,
   each of the plurality of elements corresponds to one set of target address bits, and
   greater weight is given to elements of the plurality of elements corresponding to more recent history of the path history register.

4. The method of claim 3, wherein a shift selects a subset of bits from a vector element of one size to store in a vector element of a smaller size during an update shift of the plurality of elements of the path history register.

5. The method of claim 3, wherein the hash function operation generates a smaller number of bits from a vector element of one size to store in a vector element of a smaller size during an update shift of the plurality of elements of the path history register.

6. The method of claim 1, wherein the path history register is operatively coupled to a recent target table to produce a target address prediction for an indirect branch.

7. The method of claim 6, further comprising combining data of the path history register with data of an indirect branch address and a branch history register.

8. The method of claim 1, wherein in response to no distinct history elements being readily discernable in the path history register, a new global target vector is computed based on performing a hash function operation on a prior global target vector and the target address bits.

9. The method of claim 1, further comprising:
   using predicted target address information to update the path history register;
   checking a prediction in branch execution logic for a misprediction;
   if the misprediction is found, updating and correcting the path history register; and
   updating a recent target table.

10. The method of claim 9, further comprising:
    storing recovery information;
    accessing the recovery information in branch execution logic; and
    computing an updated path history vector in response to an indirect branch prediction.

11. The method of claim 6, wherein the recent target table is accessed using an access value, and the access value corresponds to an index in a direct mapped recent target table.

12. The method of claim 6, further comprising:
    correlating the path history register and at least one of an instruction address and a directional global branch history vector to generate an access value; and
    accessing the recent target table using the generated access value.

13. A computer program product comprising a computer useable medium having a computer readable program that, when executed on a computer, causes the computer to maintain a path history register by:

generating a set of bits based on a set of target address bits from a register-indirect branch instruction using a bit selection and a hash function operation;

inserting the generated set of bits into a path history register by shifting bits in the path history register and applying a hash function operation; and removing information corresponding to prior history from the path history register, using a shift out operation and a hash function operation;

wherein removing information corresponding to prior history from the path history register, using the shift out operation and the hash function operation comprises:

applying a first hash function operation to a value of a next to an oldest history element and copying a result of the first hash function operation into the oldest history element during the shift out operation;

applying a second hash function operation on a value of a recent history element and copying a result of the second hash function operation into the next to the oldest history element during the shift out operation; and applying a third hash function operation on the set of target address bits and copying a result of the third hash function operation into the recent history element during the shift out operation;

wherein the result of the first hash function operation is less bits than the result of the second hash function operation; and wherein the result of the second hash function operation is less bits than the result of the third hash function operation.

14. The computer program product of claim 13, wherein the computer readable program further causes the computer to:

use predicted target address information to update the path history register;

check a prediction in branch execution logic for a misprediction; and if the misprediction is found, update and correct the path history register.

15. The computer program product of claim 13, wherein the computer readable program further causes the computer to:

combine data of a path history register with data of at least one of an indirect branch address and a branch history register.

16. A system comprising:

a recent target table; and a processor comprising a path history register, the path history register being operatively coupled to the recent target table to produce a target address prediction for an indirect branch, wherein:

the processor is configured to generate a set of bits based on a set of target address bits using a bit selection and a hash function operation, the processor is configured to insert the generated set of bits into the path history register by shifting bits in the path history register and applying a hash operation, and the processor is configured to remove information corresponding to prior history from the path history register, using a shift out operation and a hash function operation;

wherein removing information corresponding to prior history from the path history register, using the shift out operation and the hash function operation comprises:

applying a first hash function operation to a value of a next to an oldest history element and copying a result of the first hash function operation into the oldest history element during the shift out operation;

applying a second hash function operation on a value of a recent history element and copying a result of the second hash function operation into the next to the oldest history element during the shift out operation; and applying a third hash function operation on the set of target address bits and copying a result of the third hash function operation into the recent history element during the shift out operation;

wherein the result of the first hash function operation is less bits than the result of the second hash function operation; and wherein the result of the second hash function operation is less bits than the result of the third hash function operation.

17. The system of claim 16, wherein the prior history of the path history register comprises a plurality of elements, each of the plurality of elements corresponds to one set of target address bits, and wherein either elements of the plurality of elements are of equal size or greater weight is given to elements corresponding to more recent history of the path history register.

18. The system of claim 17, wherein the shift out operation selects a subset of bits from a vector element of one size to store in a vector element of a smaller size during an update shift of the plurality of elements of the path history register, or wherein the hash operation generates a smaller number of bits from a vector element of one size to store in a vector element of a smaller size during an update shift of the plurality of elements of the path history register.

19. The system of claim 16, wherein:

the processor is configured to use predicted target address information to update the path history register after a prediction and to store recovery information, the processor is configured to check the prediction in branch execution logic for a misprediction, and the processor is configured to access the recovery information, update the path history register, and correct the path history register, if the misprediction occurs.

* * * * *